(12) United States Patent
Cox et al.

(10) Patent No.: US 6,488,904 B1
(45) Date of Patent: Dec. 3, 2002

(54) METHOD OF CONTROLLING EMISSIONS IN EXHAUST GASES FROM A TWO-STROKE GASOLINE ENGINE

(75) Inventors: Julian Peter Cox, Reading (GB); Julia Margaret Evans, Oxon (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/622,254

(22) PCT Filed: Feb. 10, 1999

(86) PCT No.: PCT/GB99/00419

§ 371 (c)(1),
(2), (4) Date: Aug. 16, 2000

(87) PCT Pub. No.: WO99/42202

PCT Pub. Date: Aug. 26, 1999

(30) Foreign Application Priority Data

Feb. 20, 1998 (GB) ............................................. 9803554

(51) Int. Cl.[7] .............................. B01D 53/56; F01N 3/10
(52) U.S. Cl. ................................. 423/213.5; 423/245.1; 60/274; 60/299; 60/302
(58) Field of Search ........................... 423/213.5, 239.1, 423/245.1; 60/273, 274, 299, 302

(56) References Cited

U.S. PATENT DOCUMENTS

| | | | |
|---|---|---|---|
| 4,702,897 A | 10/1987 | Onal ...................... | 423/213.15 |
| 5,208,206 A | 5/1993 | Yasaki et al. ................ | 502/334 |
| 5,427,989 A | 6/1995 | Kanesaka et al. ............. | 502/66 |
| 5,983,628 A * | 11/1999 | Borroni-Bird et al. ........ | 60/274 |
| 6,101,991 A * | 8/2000 | Glover ........................ | 123/73 |

FOREIGN PATENT DOCUMENTS

| | | |
|---|---|---|
| DE | 37 29 683 | 3/1989 |
| EP | 0 666 106 | 8/1995 |
| GB | 1 474 627 | 5/1977 |
| JP | 01127044 | 5/1989 |
| WO | WO 98/06492 | 2/1998 |

OTHER PUBLICATIONS

International Search Report for PCT/GB99/00419, issued Jun. 7, 1999.
British Patent Office Search Report for priority application GB 9803554.6, issued Jun. 15, 1998.
Ronald M. Heck et al., Catalytic Air Pollution Control: Commercial Technology (John Wiley & Sons, Inc., 1995), pp. 51 and 73–82.
David Coultas et al., "The Development and Application of 2–Stroke Catalysts for 2–Wheelers in Europe and Asia," Society of Automotive Engineers, Inc., 2001, Paper No. 2001 01 1821.

* cited by examiner

Primary Examiner—Wayne A. Langel
Assistant Examiner—Maribel Medina
(74) Attorney, Agent, or Firm—Ratner & Prestia

(57) ABSTRACT

An exhaust gas catalyst especially for small two-stroke gasoline engines comprises a platinum group metal deposited on a refractory metal honeycomb support and is provided with a diffusion barrier coating which reduces conversion without reducing light-off temperatures. Prolonged catalyst life is shown when exposed to misfire conditions.

5 Claims, 1 Drawing Sheet

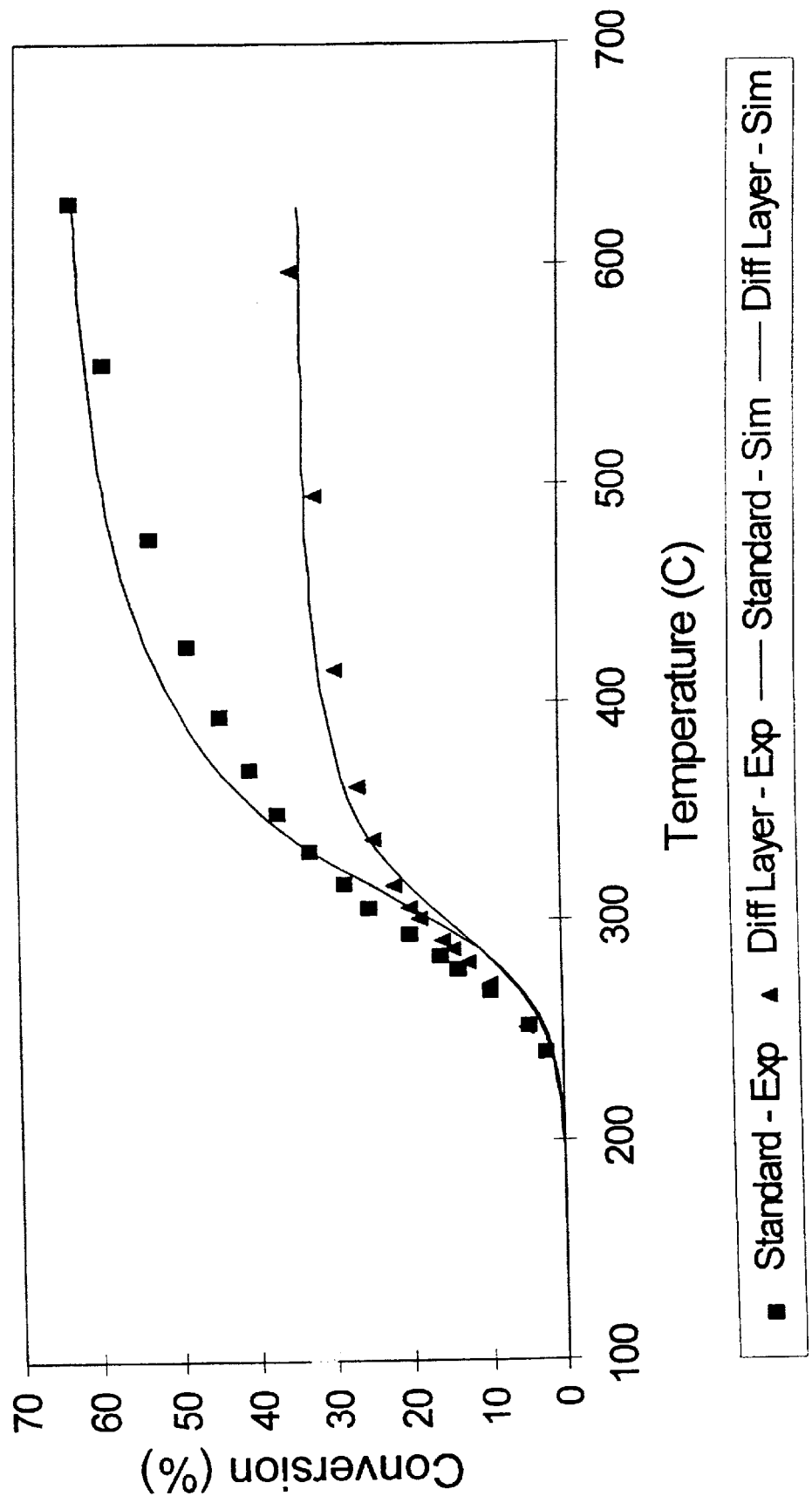

METHOD OF CONTROLLING EMISSIONS IN EXHAUST GASES FROM A TWO-STROKE GASOLINE ENGINE

This application is the U.S. national-phase application of PCT International Application No. PCT/GB99/00419.

The present invention concerns improvements in automotive catalysts, and more especially it concerns improvements in catalysts suitable for motorcycle engines and like engines.

In many parts of the world, major automotive atmospheric pollution is caused by motor cycle engines, used either for motorcycles as such, which term is intended to include scooters and mopeds, or as engines for small people- or goods-carriers, such as three-wheelers. The most challenging problem is to deal with exhaust emissions from two-stroke engines. Such engines are generally tuned to run lean for fuel economy but the exhaust gases contain high amounts of unburnt hydrocarbons. Such engines are prone to mis-firing, especially if not very well maintained. Conventional automotive catalytic convertors have been found to be unable to deal with the very high levels of hydrocarbon (HC) emissions, and tend to burn out or melt as catalytic oxidation generates temperatures well in excess of 1000° C. sometimes approaching 2000° C. In fact, no catalyst substrate is capable of withstanding such temperatures. There is therefore a great demand for a solution to this problem.

It appears that there have been suggestions to provide certain top or "over" coatings on conventional catalytic convertors to act as a reactant layer or diffusion barrier to prevent poisoning of the catalytic convertor or to prevent the reaction of sulphur-containing fuel components in diesel fuels. We do not believe that the present invention has previously been conceived.

The present invention provides the combination of an emission control system and a two-stroke gasoline engine, said system comprising a refractory metal honeycomb substrate, a platinum-based catalyst distributed on the substrate, and a refractory diffusion barrier coating on said catalyst capable of reducing HC oxidation. Desirably, the diffusion barrier is a simple coating of a material such as alumina, although other materials which are refractory under typical operating conditions whilst retaining diffusion barrier properties, may be used. Natural or synthetic zeolites are particularly to be considered.

The invention further provides a method of controlling emissions from two-stroke gasoline engines, comprising passing the emissions over a catalytic convertor, characterised in that the catalytic convertor comprises a refractory metal honeycomb substrate, a platinum-based catalyst distributed on the substrate and a refractory diffusion barrier on said catalyst, capable of reducing peak HC oxidation.

The diffusion barrier must not, of course, act as a complete barrier to hydrocarbons, although it may be desirable to use molecular sieve materials which are capable of preventing access of large molecules, such as from lubricating oil, to the catalyst layer. It is well known in automotive catalyst manufacture to use a washcoat comprising a slurry of fine alumina particles deposited onto the substrate, in order to extend the effective surface area available for deposit of the catalytic layer. Essentially similar technology may be used to apply the diffusion barrier according to the present invention. Using an alumina washcoat formulation, suitable barrier thicknesses may be expressed in loading terms as from about 0.5 $g/in^3$ to about 1.2 $g/m^3$ of catalyst volume for a conventional metal honeycomb support.

The catalyst is suitably platinum-based, for example containing 40–60 g $Pt/ft^3$ of catalyst volume. Other components or promoters, such as rhodium or other precious or base metals, may be incorporated into the catalyst Suitable metal substrates are commercially available and may be that known as Fecralloy. Desirably, it has 200 or lower, eg 100 or lower cells per sq in (31 $cell/cm^2$ or 15.5 $cells/cm^2$). Desirably, the substrate is provided with a washcoat layer of alumina, which may contain other components such as ceria or zirconia-stabilised ceria In general, it is envisaged that the catalyst will be located within the silencer box, and is desirably spaced from the box by an insulating air space to ensure that surface temperatures do not become excessive or dangerous.

The present invention provides, therefore, a catalyst system that prevents peaks of excess HC reaching the catalyst, yet retains the required light-off performance. An alternative approach, of reducing precious metal loading on the catalyst, would reduce sensitivity to overload conditions but would increase light-off temperature so that the catalyst would not operate well when cold, upon start-up and when combined with the generally low exhaust gas temperatures from two-stroke engines, the catalyst may not be able to sustain operating temperatures above light-off. Desirably, the catalyst of the present invention, incorporating the diffusion barrier is effective to convert about 30 wt % to about 45 wt % of hydrocarbons at a catalyst inlet temperature of about 320° C. and under typical space velocities.

A further advantage resulting from the present invention is that the diffusion barrier in its preferred embodiments prevents or slows the poisoning of the catalyst surface caused by engine oil components, eg phosphorus, or arising from poor quality fuel, but these are advantages and not the primary purpose of the invention.

The present invention is illustrated by comparing the performance of a conventional exhaust gas catalyst carrying 40 $g/ft^3$ of a precious metal mixture of Pt/Rh in a 18:1 wt ratio, on a 100 cells/sq in Fecralloy metal substrate. The catalyst is 33mm diameter and 75.4 mm length and is mounted in the silencer of a 125 cc two-stroke motorcycle engine, the catalyst being surrounded by a 15 mm air jacket. The catalyst was assessed over the Indian Drive Cycle test, and demonstrated 60% conversion of hydrocarbons. Road tests showed that the catalysts were becoming hot enough to melt the metal substrate (Fecralloy has an upper temperature limit of 1250° C.). We assessed that this was because mis-fires during road running were causing large quantities of unburnt hydrocarbons to reach the catalyst and the exotherm was causing rapid heating of the catalyst Mathematical modelling of this system indicates that even under perfect running, the metal monolith temperature quickly attained the upper temperature limit of 1250° C. but did not exceed it, at 60% conversion. Under a mis-fire condition, if 60% conversions were still attained, monolith temperatures reached in excess of 1900° C. within a second or two.

Further samples of catalyst were prepared by depositing differing quantities of standard washcoat alumina onto the identical catalyst, and firing at 500° C. A coating of 0.5 $g/in^3$ of alumina reduces hydrocarbon conversions from 60% to about 40%. Modelling indicates that the maximum temperature under mis-fire conditions is reduced by 400° C. A thicker coating, of 1.2 $g/in^3$ alumina, lowers the maximum conversion to 28% and lowers the maximum temperature to below the substrate upper temperature limit The FIG. attached is a plot of experimental and modelled ("Sim") results for conversion of methane against gas temperature at the inlet for the conventional and for the diffusion barrier-coated catalysts.

It will readily be understood that the principles of the present invention may be used to develop different examples of coated catalysts. In particular, the initial work has been carried out using alumina only; whilst this is inexpensive and easy to carry out, it may be expected that alternative or modified materials may be developed. It should further be understood that catalyst activity may be controlled additionally in a number of different ways, whilst still retaining the principles of the present invention. For example, the catalyst activity may be adjusted by altering the loading, altering the length of the monolithic support, changing the dimensions of the monolithic support channels and/or by catalyst gradients in any dimension.

What is claimed is:

1. A method of controlling emissions in exhaust gases from a two-stroke gasoline engine comprising the steps of:

passing the exhaust gases over a catalytic converter comprising a refractory metal honeycomb substrate, a first layer comprising a platinum group metal-based catalyst and a second layer consisting essentially of a refractory diffusion barrier on the first layer capable of acting as a partial barrier to unburnt hydrocarbons whereby hydrocarbon oxidation is reduced compared to the substrate consisting of the platinum group metal-based catalyst; and reducing the heat exposure of the substrate by configuring the second layer as a refractory diffusion barrier.

2. A method according to claim 1, wherein said barrier is high surface area alumina deposited at 0.5 g to 1.2 g/in$^3$ (0.03 to 0.07 g/cc) of catalyst volume.

3. A method according to claim 1, wherein said barrier is a natural or synthetic zeolite.

4. A method according to claim 3, wherein the engine is mounted in a motorcycle or three-wheeled vehicle.

5. A method according to claim 1, wherein the diffusion barrier is effective to reduce the oxidation of hydrocarbons in a range from 30 to 45% by weight of the hydrocarbons in the exhaust gases at a catalyst inlet temperature of about 320° C. and under a typical space velocity.

* * * * *